United States Patent

Hotta et al.

[11] Patent Number: 6,053,417
[45] Date of Patent: Apr. 25, 2000

[54] EXPANSION VALVE INTEGRATED WITH ELECTROMAGNETIC VALVE

[75] Inventors: Teruyuki Hotta, Nagoya; Shigeji Ohishi; Yasuhiro Yamamoto, both of Anjo; Kazuhiko Watanabe, Sagamihara, all of Japan

[73] Assignees: Denso Corporation, Kariya; Fujikoki Corporation, Tokyo, both of Japan

[21] Appl. No.: 09/212,179

[22] Filed: Dec. 15, 1998

[30] Foreign Application Priority Data

Dec. 22, 1997 [JP] Japan ................................. 9-353408

[51] Int. Cl.⁷ ...................................................... F25B 41/04
[52] U.S. Cl. ............................................ 236/92 B; 62/225
[58] Field of Search .............................. 62/225; 236/92 B

[56] References Cited

U.S. PATENT DOCUMENTS

| | | | |
|---|---|---|---|
| Re. 26,161 | 2/1967 | Leimbach et al. | 62/225 |
| 2,221,062 | 11/1940 | Starr . | |
| 5,588,590 | 12/1996 | Sakakibara et al. | 236/92 B |
| 5,826,438 | 10/1998 | Ohishi et al. | 62/199 |

FOREIGN PATENT DOCUMENTS

| | | |
|---|---|---|
| 0 266 301 | 5/1988 | European Pat. Off. . |
| 8-21733 | 8/1996 | Japan . |

Primary Examiner—William E. Tapolcai
Attorney, Agent, or Firm—Harness, Dickey & Pierce, PLC

[57] ABSTRACT

In an expansion valve integrated with a electromagnetic valve, the expansion valve has an inlet refrigerant path for introducing refrigerant, a restriction path for decompressing and expanding the refrigerant, a valve element for adjusting an opening degree of the restriction path, a valve element operating unit, and an outlet refrigerant path for discharging the refrigerant. The outlet refrigerant path is opened or closed by the electromagnetic valve. When the electromagnetic valve is closed, the valve element operating unit closes the valve element in the restriction path, based on a refrigerant pressure in a space between a valve element of the electromagnetic valve and the restriction path. The space communicates with the inlet refrigerant path through a minute communication hole.

5 Claims, 9 Drawing Sheets

EXPANSION VALVE INTEGRATED WITH ELECTROMAGNETIC VALVE

CROSS REFERENCE TO RELATED APPLICATION

This application is based upon and claims the benefit of priority of the prior Japanese Patent Application No. 9-353408, filed on Dec. 22, 1997, the contents of which are incorporated herein by reference.

BACKGROUND OF THE INVENTION

1. Field of the Invention

The present invention relates to an expansion valve integrated with an electromagnetic valve, in which the electromagnetic valve is disposed at a downstream side of the expansion valve and both are integrated. The present invention is suitably employed in, for example, an air conditioning apparatus for a vehicle, which has an air conditioning unit incorporating therein evaporators of a refrigeration cycle, disposed at a front side and a rear side, respectively, in a passenger compartment.

2. Description of the Related Art

A conventional air conditioning unit includes cooling evaporators respectively disposed on a front side and a rear side of a passenger compartment of a vehicle for independently performing an air conditioning control at the front side and at the rear side of the compartment. Each of the cooling evaporators is disposed in parallel to an expansion valve for decompressing refrigerant flowing into the evaporators.

In this refrigeration cycle, an electromagnetic valve is connected to the expansion valve in series and switches a flow of the refrigerant into the respective evaporators. When the electromagnetic valve is rapidly opened or closed, however, water hammer noise is liable to be generated. To solve this problem, JP-A-7-151422 proposes an expansion valve integrated with an electromagnetic valve which is disposed at a downstream side of the expansion valve, i.e., in a path at a low-pressure side through which gas and liquid two phase refrigerant flows. Accordingly, both of the electromagnetic valve and the expansion valve are downsized, and simultaneously, the water hammer noise generated when the electromagnetic valve is closed is reduced.

However, as a result from various studies and examinations of the above-described expansion valve integrated with the electromagnetic valve by the inventors, it turns out that the noise generated when the electromagnetic valve is opened cannot be reduced due to the following reasons.

That is, when the refrigerant is stopped by the closed electromagnetic valve not to flow into one of the evaporators in the refrigeration cycle, a temperature of the evaporator increases up to an ambient temperature (a room temperature). Therefore, a temperature of a temperature sensing bulb disposed at a refrigerant outlet side of the evaporator also increases up to the room temperature. In contrast, a pressure at a low-pressure side of this expansion valve lowers by the refrigerant circulating into the other evaporator (by an operation of a compressor). As a result, a force is applied to a valve body of the expansion valve to fully open the expansion valve. Accordingly, when the electromagnetic valve is opened in the sate where the expansion valve is fully opened, a large amount of the refrigerant, which has been stopped, starts to flow into the evaporator suddenly. As a result, there arises noise by the refrigerant flow and by sudden pressure drop at the downstream side of the expansion valve.

Therefore, the applicant of the present invention proposes, in U.S. application Ser. No. 08/884,758, another type of expansion valve integrated with an electromagnetic valve capable of effectively reducing refrigerant flow noise which is generated when the electromagnetic valve is opened. The expansion valve integrated with the electromagnetic valve includes a restriction path for decompressing and expanding high-pressure side refrigerant, a valve element for adjusting an opening degree of the restriction path, a valve element operating mechanism for moving the valve element, an outlet refrigerant path for supplying the refrigerant, which is decompressed an expanded in the restriction path, into an evaporator. The outlet refrigerant path is closed or opened by a valve element of the electromagnetic valve. When the valve element of the electromagnetic valve is closed, the valve element operating mechanism works based on the refrigerant pressure between the valve element of the electromagnetic valve and the restriction path to close a valve element of the expansion valve provided in the restriction path.

That is, the pressure at the upstream side of the electromagnetic valve becomes the high-pressure side pressure by the operation of the refrigeration cycle while the electromagnetic valve is closed. Then, the valve element operating mechanism can be operated utilizing the high-pressure side pressure to close the valve element of the expansion valve. Accordingly, when the electromagnetic valve is opened after that, a large amount of the refrigerant is prevented from suddenly flowing into the evaporator, so that refrigerant flow noise and the like do not occur when the electromagnetic valve is opened.

The inventors of the present invention further manufactured and studied the expansion valve integrated with the electromagnetic valve proposed in the previous application described above, and accordingly found out the following problem. That is, when the electromagnetic valve is closed, the space between the valve element of the electromagnetic valve and the valve element in the restriction path of the expansion valve is substantially sealed. When the sealed space is filled with liquid-phase refrigerant, the pressure in the sealed space can abnormally increase to, for example, more than 60 $kg/cm^2$ in accordance with a rise in atmospheric temperature. The abnormal increase in the pressure may cause deformation and damage to the parts such as a diaphragm of the valve element operating mechanism, a diaphragm casing member, and the like.

SUMMARY OF THE INVENTION

The present invention has been made in view of the above problems. An object of the present invention is, in an expansion vale integrated with an electromagnetic valve, to reduce refrigerant flow noise produced when the electromagnetic valve is opened, and simultaneously to prevent abnormal increase in pressure in a space formed between a valve element of the electromagnetic valve and a valve element of the expansion valve.

In an expansion valve integrated with an electromagnetic valve according to the present invention, the electromagnetic valve is integrally assembled to an expansion valve body. The expansion valve body has an inlet refrigerant path for introducing refrigerant, a restriction path for decompressing and expanding the refrigerant introduced from the inlet refrigerant path, and an outlet refrigerant path for discharging therefrom the refrigerant decompressed and expanded in the restriction path. The expansion valve integrated with the electromagnetic valve further has a first valve element for adjusting an opening degree of the restriction path, a valve member operating mechanism for moving the first valve member, a second valve element disposed in the electromagnetic valve to open and close the outlet refrigerant path. When the second valve element is closed, the valve element operating mechanism operates based on a refrigerant pressure in a space between the second valve element and the restriction path such that the first valve element is closed. Further, the space between the second valve element and the restriction path communicates with the inlet refrigerant path through a communication passage.

Accordingly, when the second valve element is opened, the refrigerant is prevented from suddenly flowing into the outlet refrigerant path so that refrigerant flow noise is not produced. Because the electromagnetic valve is disposed in a gas-liquid two phase refrigerant region on a downstream side of the valve element of the expansion valve, water hammer noise is also reduced. In addition, because the space between the second valve element and the restriction path always communicates with the inlet refrigerant path through the communication passage, the space can be prevented from being sealed and from having an abnormally increased pressure. As a result, the parts of the electromagnetic valve integrated with the expansion valve such as a diaphragm and a diaphragm casing member of the valve element operating mechanism are not damaged by the abnormally increased pressure.

The communication passage may be a minute hole formed in the expansion valve body. Otherwise, the communication passage may be a groove formed on a valve seat of the expansion valve body on which the first valve member is seated. In this case, the restriction path is provided between the valve seat and the first valve member, and when the first valve member is seated on the valve seat, the space communicates with the inlet refrigerant path through the groove.

BRIEF DESCRIPTION OF THE DRAWINGS

Other objects and features of the present invention will become more readily apparent from a better understanding of the preferred embodiments described below with reference to the following drawings.

DETAILED DESCRIPTION OF THE PREFERRED EMBODIMENTS (First Embodiment)

A first preferred embodiment of the present invention will be described with reference to FIGS. 1 to 5. A refrigeration cycle shown is used for an air conditioning apparatus for a vehicle, which has air conditioning units provided at a front seat side and a rear seat side of the vehicle and independently controlled.

Figure 1:
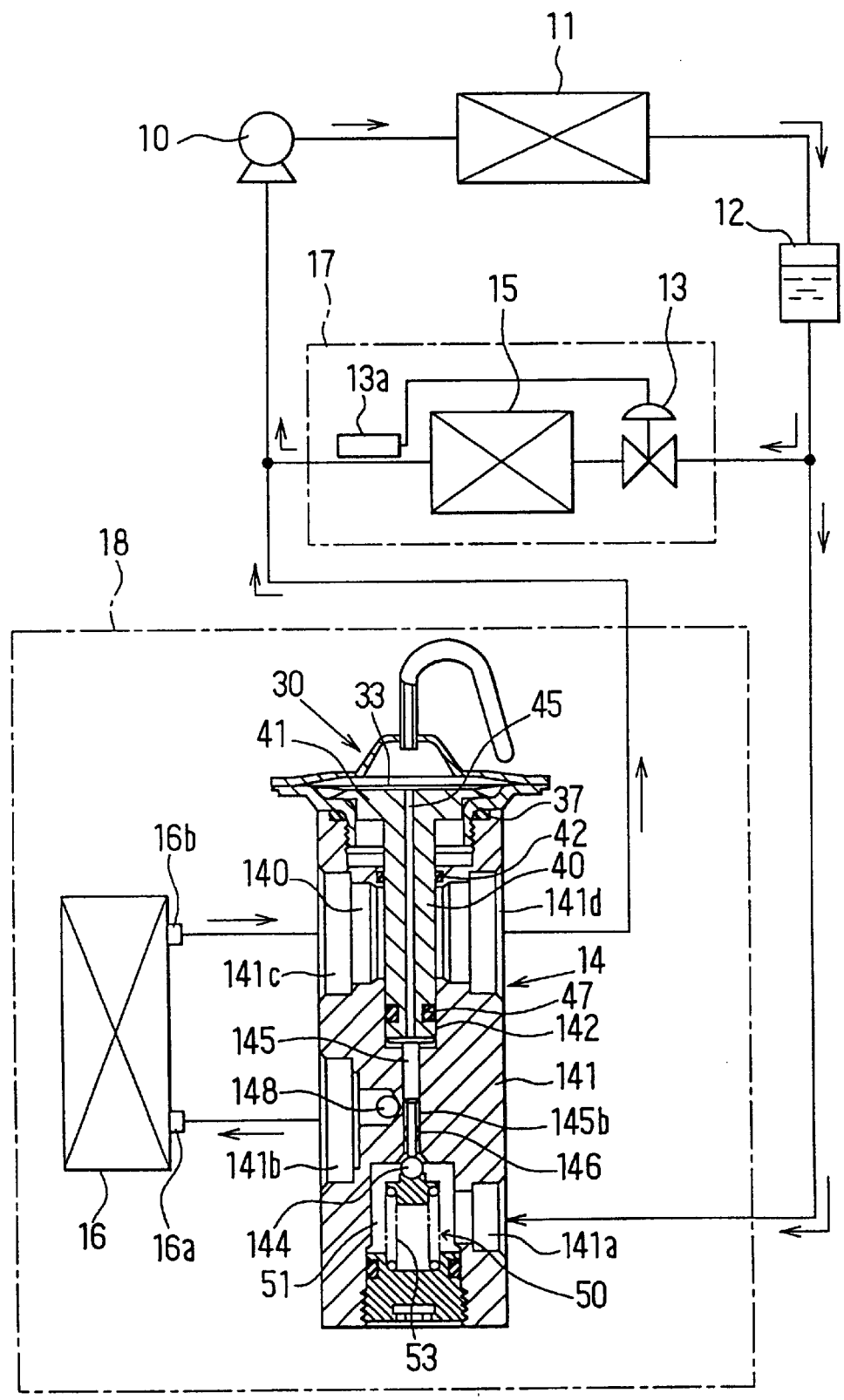
FIG. 1 is a diagram, in which a cross-sectional view showing an expansion valve integrated with an electromagnetic valve is included, showing a refrigeration cycle according to a first preferred embodiment.

Referring to FIG. 1, the refrigeration cycle is provided with a compressor 10 to which an electromagnetic clutch (not shown) for intermitting transmission of a driving force is attached. When the electromagnetic clutch is turned on to transmit the driving force from an engine of the vehicle to the compressor, the compressor is operated to compress sucked refrigerant and discharges gas-phase refrigerant having high-temperature and high-pressure. A condenser 11 cools and condenses the gas-phase refrigerant discharged from a compressor 10 while receiving cooling air blown by a cooling fan (not shown), and the condensed liquid-phase refrigerant flows into a receiver 12. The receiver 12 separates the condensed refrigerant therein into gas-phase refrigerant and liquid-phase refrigerant and discharges only liquid-phase refrigerant.

First and second expansion valves 13, 14 are disposed at the downstream side of the receiver 12 to expand the liquid refrigerant into the gas-liquid two phase refrigerant while reducing the pressure, and first and second evaporators 15, 16 are disposed in parallel with each other to evaporate the refrigerant discharged from the expansion valves 13, 14.

The first expansion valve 13 and the first evaporator 15 are mounted in a front air conditioning unit 17 disposed at a dashboard portion in the passenger compartment and are used for air conditioning of a front seat side in the passenger compartment. The first expansion valve 13 is of a thermal type in which a valve opening degree is automatically adjusted to maintain a superheating degree of the outlet-side refrigerant at a predetermined value, and has a temperature sensing bulb 13a for sensing a temperature of the outlet-side refrigerant of the first evaporator 15. The pressure of the refrigerant in the first expansion valve 13 is varied in response to the temperature detected by the temperature sensing bulb 13a.

On the other hand, the second expansion valve 14 and the second evaporator 16 are mounted in a rear air conditioning unit 18 disposed at a rear portion in the passenger compartment, e.g., in a ceiling portion of a stationary wagon type car, and are used for an air conditioning of a rear seat side in the passenger compartment. It is apparent that an air conditioning blower or the like, which is not shown, is incorporated in each of the front and rear air conditioning units 17, 18. The refrigerant outlet-sides of the first and second evaporators 15, 16 join together and are connected to a suction side of the compressor 10.

The second expansion valve 14 is constructed as the expansion valve integrated with the electromagnetic valve and will be described more specifically with reference to FIGS. 2 to 5. In this embodiment, the expansion valve 14 is constructed as a box-type expansion valve and has therein a low-pressure refrigerant path 140 through which the refrigerant discharged from the evaporator 16 flows. A temperature sensing mechanism (described later) for sensing a temperature of the refrigerant flowing through the low-pressure refrigerant path 140 is integrally incorporated in the expansion valve 14.

A normally-closed type electromagnetic valve 20 (see FIG. 2) is integrally assembled to the box-type expansion valve 14. The expansion valve 14 is provided with a prism-shaped valve body 141 made of metal such as aluminum. As shown in FIG. 1, the valve body 141 has a refrigerant inlet 141a and a refrigerant outlet 141b at positions adjacent to a lower side portion of an outer circumferential wall thereof. The high-pressure side liquid-phase refrigerant from the receiver 12 flows into the refrigerant inlet 141a, and is decompressed and is expanded to be low-pressure refrigerant in a restriction path 144 described later. Then, the low-pressure refrigerant flows out through the refrigerant outlet 141b. The refrigerant outlet 141b is connected to a refrigerant inlet 16a of the evaporator 16.

The low-pressure refrigerant path 140 is formed in an upper side portion of the valve body 141 to pass through the valve body 141 in a direction perpendicular to an axial direction of the valve body 141. A refrigerant inlet 141c and a refrigerant outlet 141d are open at both ends of the low-pressure refrigerant path 140. The refrigerant inlet 141c is connected to an outlet 16b of the evaporator 16 such that the gas-phase refrigerant evaporated in the evaporator 16 flows into the refrigerant inlet 141c. The gas-phase refrigerant further passes through the low-pressure refrigerant path 140 and flows from the refrigerant outlet 141d out of the valve body 141. The refrigerant outlet 141d is connected to an inlet side of the compressor 10.

In a center portion of the valve body 141, a stepped inner hole 142 having a stepped portion is coaxially formed. The stepped inner hole 142 passes through the low-pressure refrigerant path 140 and extends vertically, i.e., in an up and down direction, in the center portion of the valve body 141. A valve seat 143 is formed at a lower end portion of the stepped inner hole 142, and a spherical valve element 144 is disposed to face the valve seat 143 and to be allowed to vertically move. A restriction path 144a (see FIG. 2) for decompressing and expanding the high-pressure side liquid-phase refrigerant from the refrigerant inlet 141a is provided between the valve seat 143 and the spherical valve element 144.

An operation rod 145 is fitted into the lower side portion of the stepped inner hole to be allowed to vertically move. A lower end portion of the operation rod 145 contacts the spherical valve element 144 and moves the spherical valve element 144. The operation rod 145 has a small-diameter portion 145a at a lower side portion thereof such that an annular refrigerant path 145b is formed between the small-diameter portion 145a and the inside wall of the stepped inner hole 142.

Figure 3:
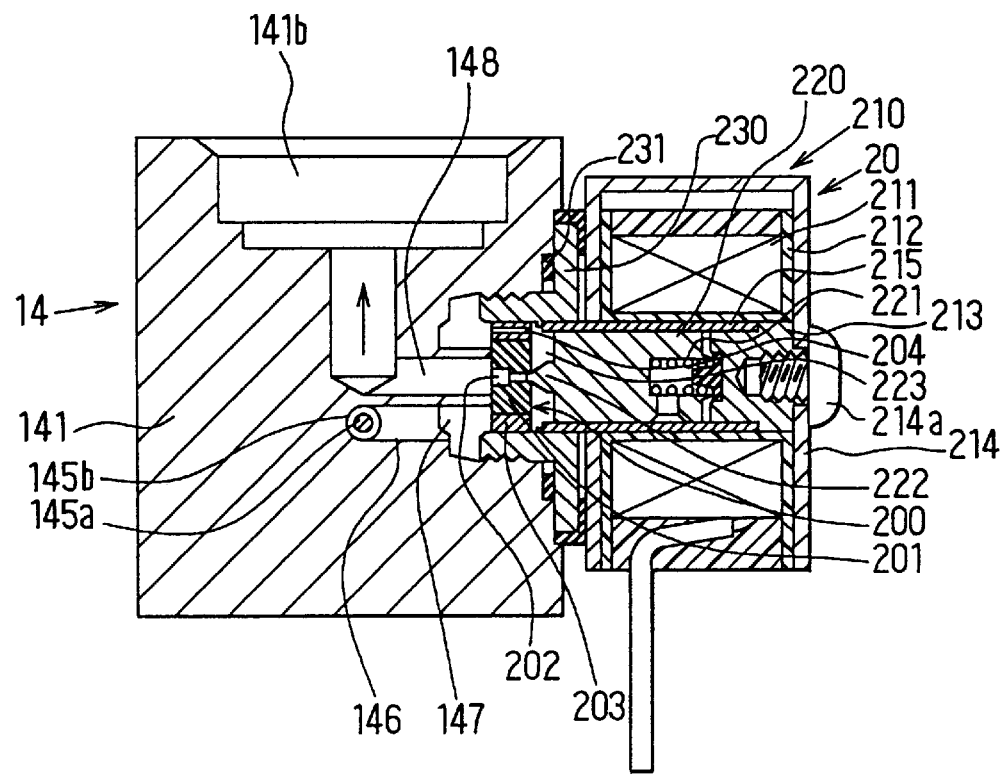
FIG. 3 is a cross-sectional view taken along a III—III line in FIG. 2, showing the electromagnetic valve.

The annular refrigerant path 145b always communicates with a communication chamber 147 through several communication holes 146 formed in the valve body 141 to extend perpendicularly to the stepped inner hole 142. Further, a cylindrical portion project into the communication chamber 147 at an intermediate portion of the several communication holes 146, and a refrigerant path 148 is provided in the cylindrical portion. A valve element 200 of the normally-closed type electromagnetic valve 20 is disposed to face an end face of the refrigerant path 148, and intermits the communication between the communication chamber 147 and the refrigerant path 148. As shown in FIG. 3, the refrigerant path 148 further communicates with the refrigerant outlet 141b. The electromagnetic valve 20 will described more specifically later.

Next, an operating mechanism for operating the valve element 144 of the expansion valve 14 will be described. A diaphragm operating unit 30 constituting the operating mechanism includes an upper casing 31, a lower casing 32, and a diaphragm 33 as a pressure responding member. Both of casings 31, 32 are made of stainless type metal and fixedly holds an outer circumferential edge portion of the disc-shaped diaphragm 33 made of similar stainless type metal. The disc-shaped diaphragm 33 is assembled to be elastically deformable in the vertical direction of FIG. 1, and partitions an inner space of both of casings 31 and 32 into a temperature sensing chamber (first pressure chamber) 34 at the upper side and a pressure equalizing chamber (second pressure chamber) 35 at the lower side. Refrigerant identical to that circulating in the refrigerant cycle is injected into the temperature sensing chamber 34 through a capillary tube 36 and is sealed therein under a predetermined pressure. An annular opening portion 32a of the casing 32 at the lower side is screwed to a large-diameter portion 142a formed at an end portion (upper end portion) of the stepped inner hole 142 of the valve body 141. At the screwed fixing portion, air-tightness is maintained by a rubber O-ring (elastic sealing member) 37.

Figure 2:
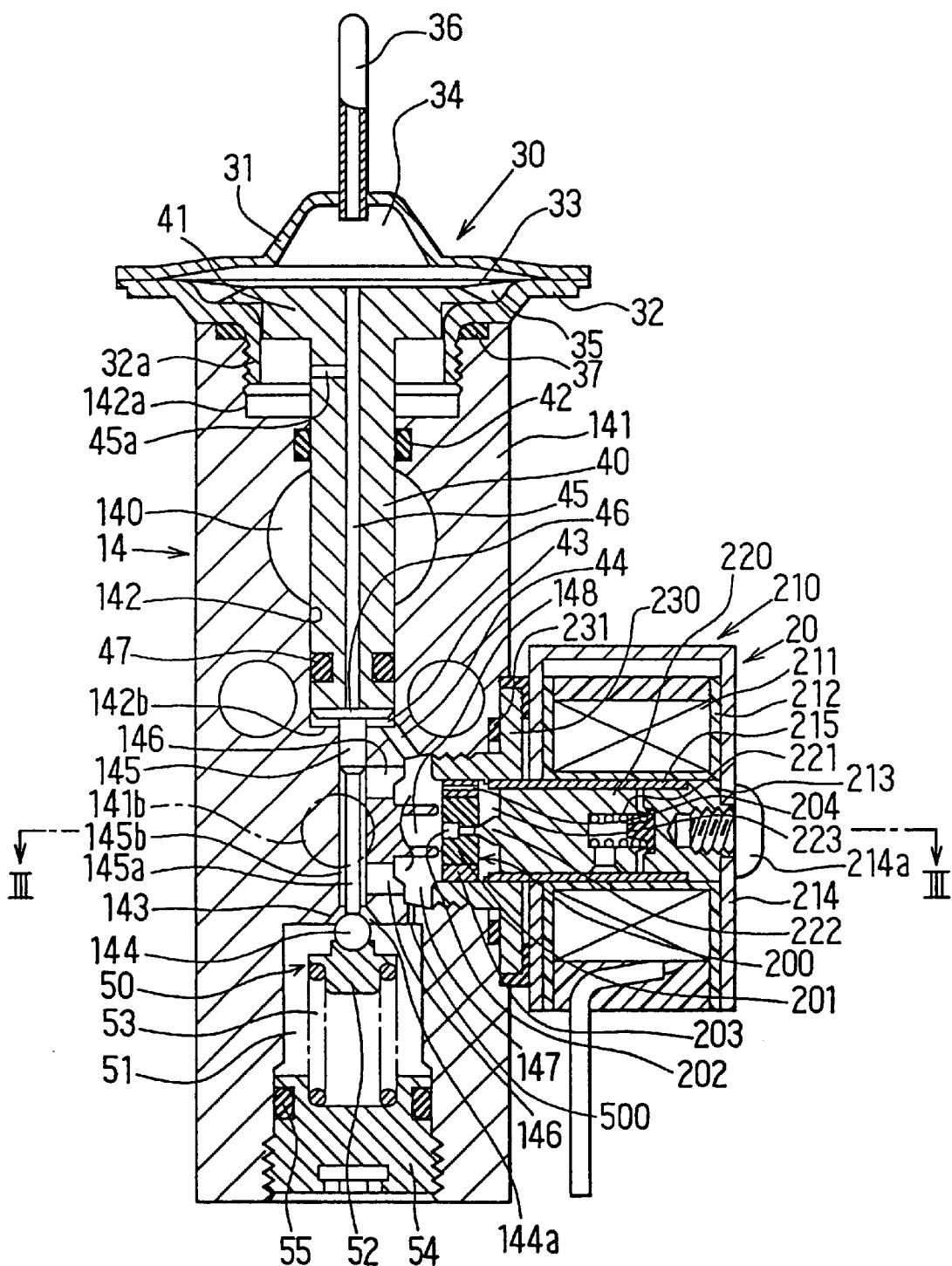
FIG. 2 is a cross-sectional view showing the expansion valve integrated with the electromagnetic valve from a side different from that in FIG. 1.

The temperature sensing rod 40 is made of a metal such as aluminum, which is superior in thermal conductivity, and is formed into a columnar shape. The temperature sensing rod 40 is disposed, as shown in FIGS. 1 and 2, to pass through the low-pressure refrigerant path 140, for sensing a temperature of the refrigerant at the outlet side of the evaporator. One end portion (upper end portion) of the temperature sensing rod 40 is constructed as a large-diameter portion 41. The large-diameter portion 41 is disposed in the pressure equalizing chamber 35 and abut a face (lower side face) of the disc-shaped diaphragm 33. Accordingly, a variation in temperature of the temperature sensing rod 40 is transmitted to the refrigerant in the temperature sensing chamber 34 through the diaphragm 33 made of metallic thin plate. The refrigerant pressure in the temperature sensing chamber 34 varies in response to the temperature of the refrigerant flowing in the low-pressure refrigerant path 140 immediately after being discharged from the outlet 16b of the evaporator 16.

The temperature sensing rod 40 is axially slidably disposed in the stepped inner hole 142 of the valve body 141, and contacts one end portion (an upper end portion) of the operation rod 145 at the other end portion (the lower end portion) of the temperature sensing rod 40. Accordingly, the temperature sensing rod 40 transmits a displacement of the diaphragm 33 to the valve element 144 through the operation rod 145. In the axial direction of the stepped inner hole 142, a rubber O-ring (elastic sealing member) 42 is disposed in a portion between the low-pressure refrigerant path 140 and the pressure equalizing chamber 35 to maintain air-tightness therebetween.

Further, the refrigerant pressure between the valve element 200 of the electromagnetic valve 20 and the restriction path 144a is introduced into the pressure equalizing chamber 35 through a pressure introduction path described below. That is, as shown in FIG. 2, a pressure chamber 43 is formed between the lower end portion of the temperature sensing rod 40 and an intermediate stepped face 142b of the stepped inner hole 142, and the pressure chamber 43 communicates with the communication chamber 147 through a communication hole 44 provided in the valve body 141.

Figure 4:
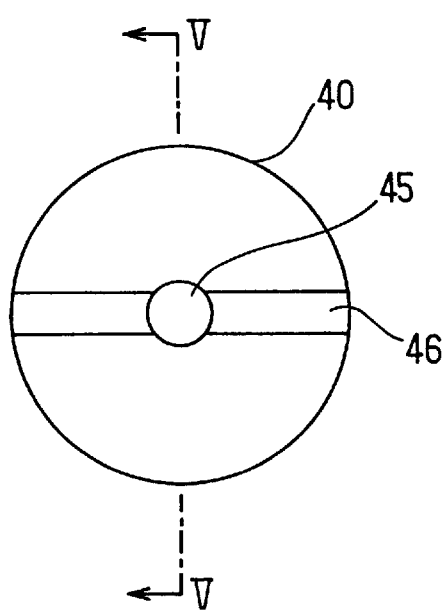
FIG. 4 is a bottom view showing a temperature sensing rod in the first embodiment.
Figure 5:
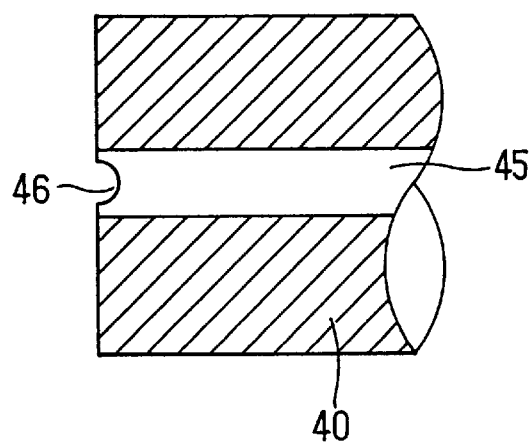
FIG. 5 is a cross-sectional view taken along a V—V line in FIG. 4.

A communication hole 45 is formed to pass through a central portion of the temperature sensing rod in the axial direction thereof, and as shown in FIGS. 4 and 5, a groove portion 46 having a U-shaped cross section is provided at the lower end portion of the temperature sensing rod 40. Therefore, even when the lower end portion of the temperature sensing rod 40 contacts the upper end portion of the operation rod 145, the pressure chamber 43 always communicates with the communication hole 45 through the groove portion 46. Through the above-described pressure introduction path composed of the communication hole 44, the pressure chamber 43, the groove portion 46, and the communication hole 45 in this order, the refrigerant pressure between the valve element 200 of the electromagnetic valve 20 and the restriction path 144a (i.e., the pressure in the communication chamber 147) is introduced into the pressure equalizing chamber 35.

The communication hole 45 is connected to an auxiliary communication hole 45a extending radially from the central portion of the temperature sensing rod 40, and the above-described refrigerant pressure is further introduced into the pressure equalizing chamber 35 through the auxiliary communication hole 45a. Each of the communication holes 44, 45 and 45a may have a diameter of approximately 1.0 mm, for example. Further, the groove portion 46 having the U-shaped cross section has a depth of approximately 0.5 mm, for example. In the axial direction of the stepped inner hole 142, a rubber O-ring (elastic sealing member) 47 is disposed in a portion between the low-pressure refrigerant path 140 and the pressure chamber 43 to maintain air-tightness therebetween.

Next, a spring mechanism 50 for applying a predetermined spring force to the valve element 144 of the expansion valve 14 will be described. The valve body 141 is formed with an accommodating chamber 51 for accommodating the spring mechanism 50 at the lower side of the stepped inner hole 142. As shown in FIG. 1, the accommodating chamber 51 communicates with the refrigerant inlet 141a into which the high-pressure refrigerant flows. A metallic support plate 52 joined by welding to the valve element 144 made of stainless is provided in the upper end portion in the accommodating chamber 51.

An end of a coil spring 53 (spring means) contacts and supports the support plate 52. The other end of the coil spring 53 is supported by a metallic plug 54. The plug 54 functions as a cover member for closing an opening end of the accommodating chamber 51 toward the outside and is detachably fixed to the valve body 141 by screws. A fixed position of the plug 54 by screws is adjusted so that a preset load of the coil spring 53 is adjusted. In this way, a spring force applied to the valve element 144 is adjusted. A superheating degree of the refrigerant at the outlet of the evaporator, which is set by the expansion valve 14, can be adjusted by adjusting the spring force. At the top end portion of the plug 54, a rubber O-ring (elastic sealing member) 55 is disposed to maintain air-tightness between the accommodating chamber 51 and the outside.

The normally-closed type electromagnetic valve 20 is a pilot type electromagnetic valve including the valve element 200, an electromagnet 210, and a columnar plunger 220 made of magnetic material. The valve element 200 has a substantially disc-shape. A minute valve hole 202 is formed in a resin member 201 at the central portion of the valve element 200. The resin member 201 is preferably formed with resin material (e.g., fluorine type resin) which can be satisfactorily molded with high accuracy in size and can sufficiently maintain a sealing performance with the end face of the refrigerant path 148.

Further, a piston member 203 made of metal such as brass is disposed on the outer circumferential portion of the resin member 201. Both are connected integrally to each other by caulking or the like. The piston member 203 is fitted slidably in the left-right direction of FIG. 2 to an inner circumferential wall of a cylindrical mounting screw member 230 made of non-magnetic metal. The mounting screw member 230 is for detachably fixing the normally-closed type electromagnetic valve 20 to the valve body 141. At the screw fixing portion of the mounting screw member 230, a rubber O-ring (elastic sealing member) 231 is disposed to maintain air-tightness between the communication chamber 147 and the outside.

The electromagnet 210 is provided with a resin bobbin 212 wound with a solenoid 211. A columnar magnetic pole member 213 is coaxially fitted in a hollow top end portion of the bobbin 212. The magnetic pole member 213 is fastened to a magnetic frame body 214 made of magnetic material by a screw 214a. Further, a cylindrical support member 215 made of non-magnetic material is coaxially and fixedly fitted in the hollow portion of the bobbin 212. The support member 215 is fixedly fitted to the outer circumferential wall of the magnetic pole member 213 at an end thereof and is fixedly fitted to the inner circumferential wall of the mounting screw member 230 at the other end thereof. In this way, the mounting screw member 230 and the electromagnet 210 are integrally connected to one another via the support member 215.

The plunger 220 is cylindrical and made of magnetic material. The plunger 220 is fitted within the hollow portion of the support member 215 to move in the axial direction of the hollow portion. The plunger 220 has a valve portion 222 projecting conically from an end face at the side of the valve element 200. The plunger 220 is biased by a coil spring 221 in the left direction of the drawing, i.e., toward the valve element 200, such that the valve portion 222 is seated on the valve element 200 to close the valve hole 202. A back pressure chamber 223 is defined between the end face of the plunger 220 at the side of valve portion 222 and the valve element 200. Further, a minute hole 204 is formed in the valve element 200 for always communicating the back pressure chamber 223 and the communication chamber 147.

In the normally-closed type electromagnetic valve 20 as constructed above, when electric current is supplied to the solenoid 211 to generate a magnetic flux, the plunger 220 is attracted by the magnetic pole member 213 while resisting the coil spring 221, and the valve portion 222 is separated from the valve element 200 so that the valve hole 202 is opened. Accordingly, the back pressure chamber 223 communicates with the refrigerant outlet 141b through the refrigerant path 148, and then the pressure in the back pressure chamber 223 drops down to the pressure at the refrigerant outlet 141b (i.e., the low-pressure of the evaporator 16).

On the other hand, the pressure in the communication chamber 147 is maintained at the high-pressure side pressure of the refrigeration cycle, because the communication between the communication chamber 147 and the refrigerant path 148 is interrupted so far. Therefore, the pressure of the communication chamber 147 becomes higher than that of the back pressure chamber 223, and accordingly the valve element 200 is moved in the right direction in FIGS. 2, 3 by a pressure difference between both chambers 147, 223. As a result, the refrigerant path 148 is opened. That is, the normally-closed type electromagnetic valve 20 moves the plunger 220 in the right direction in the drawing when electric current is supplied to the solenoid 211 to generate a pressure difference between both chambers 147, 223. As a result, the valve element 200 is opened.

As opposed to this, when electric current to be supplied to the solenoid coil 211 is stopped, the plunger 220 is moved in the left direction in FIGS. 2, 3 by the spring force of the coil spring 221, and the valve portion 222 is seated on the valve element 200 so that the valve hole 202 is closed. Accordingly, the refrigerant in the communication chamber 147 is introduced through the minute hole 204 into the back pressure chamber 223 which has been maintained at the low-pressure side pressure. Therefore, the valve element 200 is moved in the left direction in FIGS. 2 and 3 and is seated on the end face of the refrigerant path 148 to close the refrigerant path 148. In this way, the normally-closed type electromagnetic valve 20 is recovered to be closed.

Further, the valve body 141 has a minute hole 500 as a minute communication passage for connecting the communication chamber 147 and the accomodating chamber 51 of the spring mechanism 50. When the normally-closed type electromagnetic valve 20 is closed, the communication chamber 147 provided between the valve element 200 and the valve element 144 in the restriction path 144a communicates with the accommodating chamber 51 through the minute hole 500. Accordingly, the communication chamber 147 is prevented from being sealed.

Next, an operation of the embodiment having the above-described construction will be described in more detail. In FIG. 1, when the compressor 10 starts upon receiving a driving force transmitted from the engine of the vehicle through the electromagnetic clutch, the compressor 10 sucks and compresses the refrigerant in the path at the downstream sides of the evaporators 15, 16, and discharges gas-phase refrigerant having a high-temperature and a high-pressure toward the condenser 11. Then, the condenser 11 cools and condenses the gas-phase refrigerant. The condensed refrigerant flows into the receiver 12, and the gas-phase refrigerant and the liquid-phase refrigerant are separated in the receiver 12. The liquid-phase refrigerant flows out of the receiver 12 and flows toward the first and second expansion valves 13, 14 disposed in parallel.

When there is no passenger at the rear seat side, it is not necessary to perform an air conditioning of the rear seat side, and therefore, the rear air conditioning unit 18 is not operated. The electric current to be supplied to the solenoid 211 of the electromagnetic valve 20 is interrupted, so that the valve element 200 is closed to close the refrigerant path 148. Accordingly, the inlet-side refrigerant path of the second evaporator 16 is closed so that the refrigerant does not circulate into the second evaporator 16.

On the other hand, in the front air conditioning unit 17, the liquid-phase refrigerant from the receiver 12 is decompressed and expanded in the first expansion valve 13 and becomes gas-liquid two phase refrigerant. The gas-liquid two phase refrigerant is evaporated while absorbing heat from conditioned air in the first evaporator 15. The conditioned air is cooled and blown into the front seat side in the passenger compartment to perform the air conditioning. Incidentally, the opening degree of the expansion valve 13 is automatically adjusted according to a temperature of the refrigerant at the outlet of the evaporator, detected by the temperature sensing bulb 13a, so that the superheating degree of the refrigerant at the outlet of the evaporator is maintained at a predetermined value.

The second expansion valve 14 provided in the rear air conditioning unit 18 is integrated with the electromagnetic valve 20. When the electromagnetic valve 20 is closed, the refrigerant does not circulate in the second evaporator 16, and therefore the temperature of the refrigerant in the low-pressure refrigerant path 140 formed in the valve body 141 of the expansion valve 14 increases up to approximately the room temperature. Accordingly, the temperature of the temperature sensing chamber 34 also increases up to approximately the room temperature.

However, in this embodiment, the refrigerant pressure in the communication chamber 147 between the valve element 200 of the electromagnetic valve 20 and the restriction path 144a is introduced into the pressure equalizing chamber 35 through the pressure introduction path composed of the communication hole 44, the pressure chamber 43, the groove portion 46, and the communication holes 45, 45a in this order. When the electromagnetic valve 20 is closed, the communication chamber 147 communicates with the high-pressure side of the refrigeration cycle through the restriction path 144a to become the high-pressure side pressure.

Therefore, when the electromagnetic valve 20 is closed, the high-pressure side pressure of the refrigeration cycle is applied to the pressure equalizing chamber 35. Because the high-pressure side pressure is sufficiently higher than a refrigerant saturated pressure at the room temperature, even if the temperature of the temperature sensing chamber 34 increases up to approximately the room temperature, the pressure in the pressure equalizing chamber 35 is sufficiently higher than that in the temperature sensing chamber 34. As a result, the diaphragm 33 of the diaphragm operating unit 30 elastically deforms upwardly in FIG. 2 so that the valve element 144, the operation rod 145, and the temperature sensing rod 40 are moved upwardly by the spring force of the coil spring 53. As a result, the valve element 144 is seated on the valve seat 143 to be a closed state. Here, since both of the valve element 144 and the valve seat 143 are made of metal, the valve element 144 is not strictly closed so that the high-pressure side pressure in the accommodating chamber 51 leaks through the minute clearance between the valve element 144 and the valve seat face 143 toward the communication chamber 147.

The minute clearance between the valve element 144 and the valve seal face 143 is very small. Therefore, when the electromagnetic valve 20 is closed, the communication chamber 147 between the valve element 144 and the valve element 200 becomes a substantially sealed space. In this state, when the sealed space is filled with the liquid-phase refrigerant, the liquid-phase refrigerant may expand due to a rise in ambient temperature around the expansion valve 14, so that the pressure in the sealed space may be abnormally increased. However, according to this embodiment, the minute hole 500 for connecting the communication chamber 147 and the accomodating chamber 51 of the spring mechanism 50 is provided in the valve body 141. Therefore, the pressure in the communication chamber 147 can be released through the minute hole 500 into the accommodating chamber 51, and accordingly, the pressure in the communication chamber 147 can be securely prevented from abnormally increasing.

Next, in the state where the valve element 144 of the expansion valve 14 is closed, electric current is supplied to the solenoid 211 of the electromagnetic valve 20 to operate the rear air conditioning unit 18. Accordingly, the valve element 200 of the electromagnetic valve 20 is opened so that the cylindrical refrigerant path 148 is opened. At this time, since the valve element 144 of the expansion valve 14 is closed, a large amount of refrigerant does not start to flow suddenly by the opened electromagnetic valve 20.

After the electromagnetic valve 20 is opened, the pressure in the pressure equalizing chamber 35 gradually lowers through the above-described pressure introduction path down to the low-pressure side pressure. Therefore, the opening degree of the valve element 144 of the expansion valve 14 also gradually increases with the result that the amount of the refrigerant flowing through the expansion valve 14 gradually increases. In this way, it is possible to effectively suppress the noise due to the variation in the pressure before and after the valve element 144 of the expansion valve 14 as well as the flowing noise due to the large amount of the rapid flow of the refrigerant.

When a predetermined time has elapsed after the electromagnetic valve 20 is opened, the pressure in the pressure equalizing chamber 35 becomes a pressure (low pressure) of the refrigerant at the inlet side of the evaporator 16. Hereafter, the valve element 144 of the expansion valve 14 is moved to a position according to a balance of the spring force of the coil spring 53 and the pressure difference between the low pressure at the inlet side of the evaporator, which is applied to the pressure equalizing chamber 35, and the refrigerant pressure corresponding to the temperature of the refrigerant at the outlet side of the evaporator, which is applied to the temperature sensing chamber 34.

In this way, the valve element 144 of the expansion valve 14 adjusts the opening degree of the restriction path 144a for adjusting the flow amount of the refrigerant flowing therethrough such that the refrigerant at the outlet side of the evaporator can maintain a predetermined superheating degree. That is, the expansion valve 14 adjusts the flow amount of the refrigerant as an internal pressure equalizing type expansion valve.

As being understood from the above-described operation, when the electromagnetic valve 20 is closed, the high-pressure side pressure of the refrigeration cycle is applied to the pressure equalizing chamber 35 of the diaphragm operating unit 30. Therefore, when the diaphragm operating unit 30 is specifically designed, it is desirable for the diaphragm 33 to be made of stainless type material which is superior in the fatigue resistant characteristics, and for the casings 31, 32 to be formed in a shape having a thick wall.

The minute hole 500 for preventing the pressure in the communication chamber 147 from abnormally increasing is arranged approximately in parallel with the restriction path 144a. Therefore, it is necessary for the minute hole 500 to be designed not to adversely affect the effect of preventing the occurrence of the noise caused by the sudden variation in pressure and by the sudden flow of the large amount of the refrigerant, when the electromagnetic valve 20 is opened. It is also desired for the minute hole 500 to be designed not to adversely affect the operation for adjusting the flow amount of the refrigerant by the opening degree of the restriction path 144a, when the electromagnetic valve 20 is opened. As a result of studies by the inventors, it was founded that when the resistance of the minute hole 500 was significantly large as compared to that of the restriction path 144a, for example, when a diameter $\phi$ of the minute hole 500 was approximately 0.5 mm, the above requirements can be satisfied.

(Second Embodiment)

Figure 6:
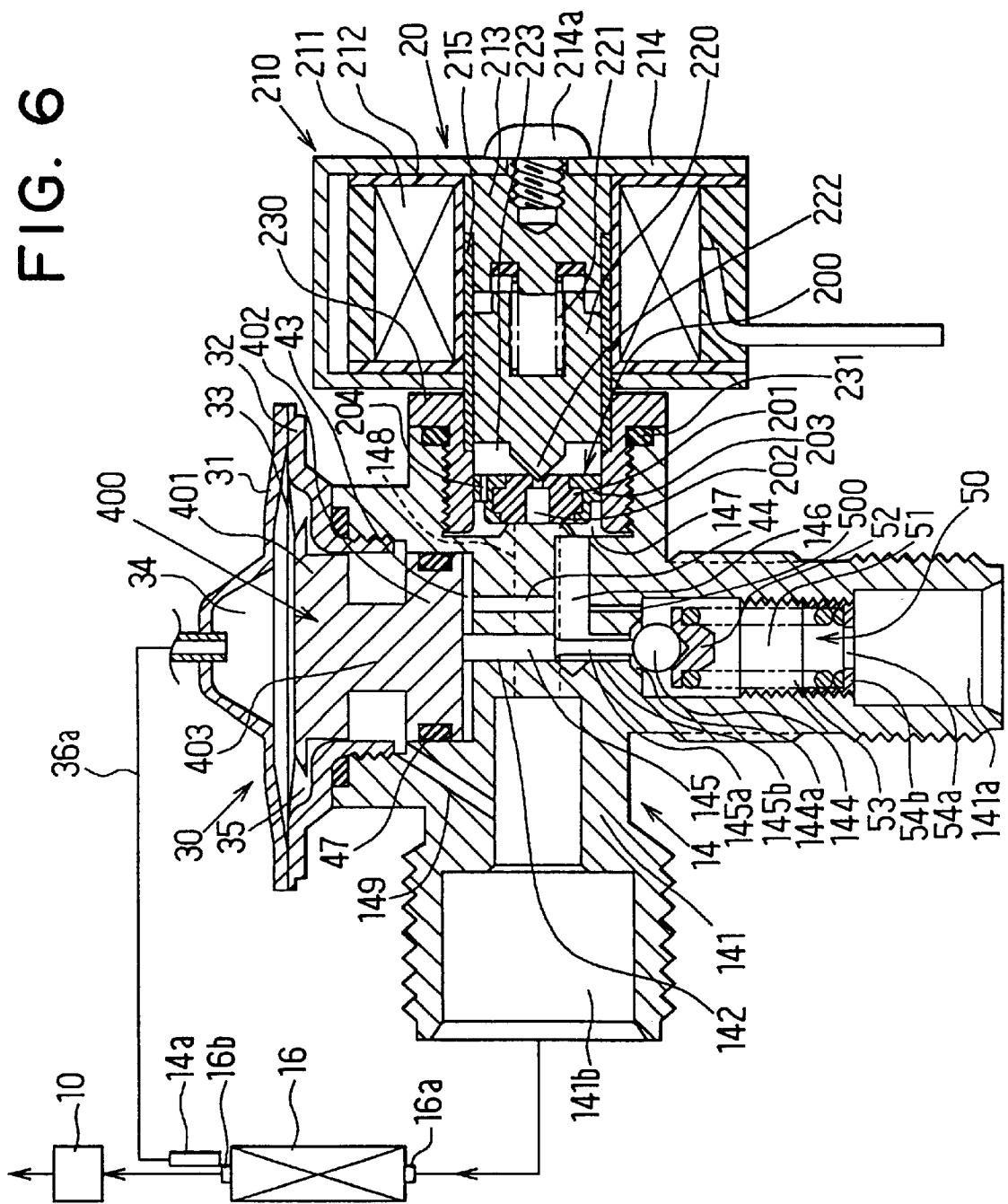
FIG. 6 is a cross-sectional view showing an expansion valve integrated with an electromagnetic valve in a second preferred embodiment.

A second preferred embodiment of the present invention will be described with reference to FIG. 6. In FIG. 6, the temperature sensing rod 40 is omitted, and instead, a temperature sensing bulb 14a corresponding to the temperature sensing bulb 13a in FIG. 1 is provided at the refrigerant outlet portion of the evaporator 16. The temperature sensing bulb 14a is connected to the temperature sensing chamber 34 through a capillary tube 36a.

Accompanied by the omission of the temperature sensing rod 40, a stopper member 400 for transmitting displacement is interposed between the operation rod 145 and the diaphragm 33. The stopper member 400 has large-diameter portions 401, 402 at both ends in the axial direction thereof and a small-diameter portion 403 at the intermediate portion. A rubber O-ring 47 (elastic sealing member) is disposed around an outer circumferential surface of the lower side large-diameter portion 402 to provide air-tightness between the pressure chamber 43 below the large-diameter portion 402 and the pressure equalizing chamber 35.

An annular refrigerant path 145b formed around the small-diameter portion 145a of the operation rod 145 communicates at the downstream side of the valve element 144 of the expansion valve 14 with the communication chamber 147 through the communication hole 146. In the same manner as in the first embodiment, the communication between the communication chamber 147 and the refrigerant path 148 communicating with the refrigerant outlet 141b is opened or closed by the valve element 200 of the electromagnetic valve 20, and the communication chamber 147 communicates with the accommodating chamber 51 for accommodating the spring mechanism 50 through the minute hole 500.

The accommodating chamber 51 is formed directly at the downstream side of the refrigerant inlet 141a. Accordingly, in the second embodiment, instead of the plug 54, a support plate 54b, in which a refrigerant flow hole 54a is opened, is screwed to the valve body 141. The communication hole 146 formed between the valve element 144 of the expansion valve 14 and the valve element 200 of the electromagnetic valve 20 communicates with the pressure chamber 43 below the large-diameter portion 402 of the stopper member 400 through a communication hole 44.

Therefore, also in the second embodiment, when the electromagnetic valve 20 is closed, the high-pressure side pressure of the refrigeration cycle is applied to the pressure chamber 43 through the communication hole 146 disposed at the upstream side of the valve element 200 and through the communication hole 44. As a result, the stopper member 400 is pushed upward, and the valve element 144 of the expansion valve 14 is closed. In this case, since the high-pressure side pressure of the refrigeration cycle is applied to the large-diameter portion 402 of the stopper member 400, the area receiving the pressure is increased as compared with the temperature sensing rod 40 in the first embodiment, so that the force for pushing the stopper member 400 upward can be increased.

Further, a communication hole 149 for connecting the refrigerant outlet 141b and the pressure equalizing chamber 35 is provided in the valve body 141 to be opened at the outer circumference side of the small-diameter portion 403 located above the O-ring 47. In this way, the refrigerant pressure at the inlet side of the evaporator 16 is introduced into the pressure equalizing chamber 35 from the refrigerant outlet 141b through the communication hole 149. Accordingly, when the electromagnetic valve 20 is opened, the valve element 144 of the expansion valve 14 is moved according to the refrigerant pressure in the temperature sensing chamber 34, which corresponds to the temperature of the refrigerant at the outlet side of the evaporator, detected by the temperature sensing bulb 14a, and to the refrigerant pressure at the inlet side of the evaporator, which is introduced into the pressure equalizing chamber 35 through the communication hole 149. In this way, the opening degree (the flow amount of the refrigerant) of the restriction path 144a is adjusted.

As being understood from the above-described operation, in the second embodiment, the pressure equalizing chamber 35 and the pressure chamber 43 are partitioned by the O-ring 47, and the high-pressure side pressure of the refrigeration cycle is not applied directly to the pressure equalizing chamber 35 when the electromagnetic valve 20 is closed. Therefore, when the diaphragm operating unit 30 is specifically designed, the diaphragm 33 or the casings 31, 32 may have compressive strength as usual.

(Third Embodiment)

Figure 7:
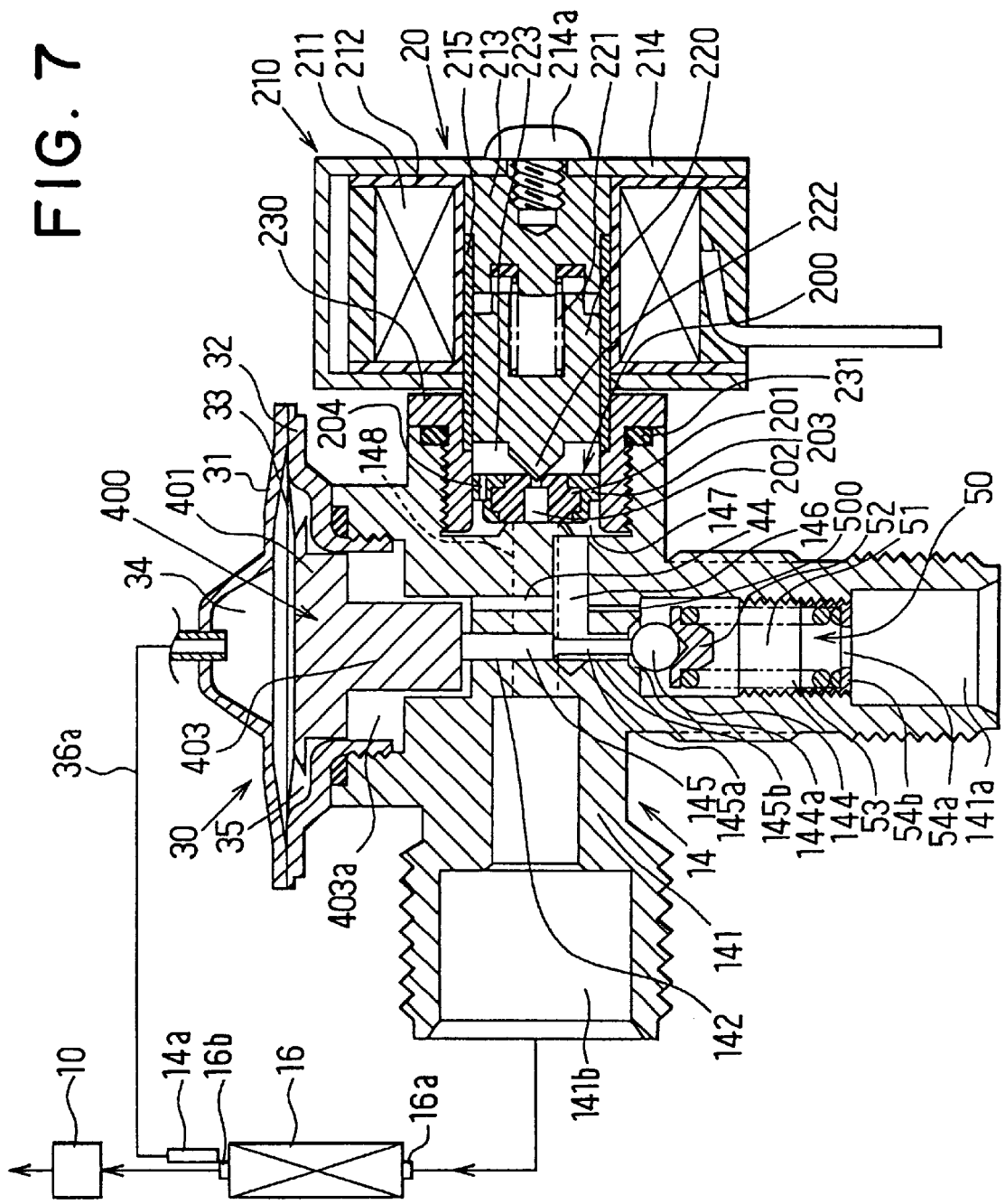
FIG. 7 is a cross-sectional view showing an expansion valve integrated with an electromagnetic valve in a third preferred embodiment.

Referring to FIG. 7, in a third preferred embodiment, the communication hole 149 of the valve body 141, the large-diameter portion 402 of the stopper member 400, and the O-ring 47 on the outer circumferential surface of the large-diameter portion 402 are omitted, and instead the small-diameter portion 403 of the stopper member 400 extends to the lower end portion. Further, a clearance portion 403a around the small-diameter portion 403 communicates with the communication hole 44. Accordingly, the pressure equalizing chamber 35 below the diaphragm 33 communicates with the communication hole 146 and the communication chamber 147 disposed at the upstream side of the valve element 200 through the above-described clearance 403a and the communication hole 44.

In the third embodiment, in the same manner as in the first embodiment, the refrigerant pressure at the upstream side of the valve element 200 is applied to the pressure equalizing chamber 35 below the diaphragm 33, and the communication chamber 147 communicates with the accommodating chamber 51 for accommodating the spring mechanism 50 through the minute hole 500.

Figure 8:
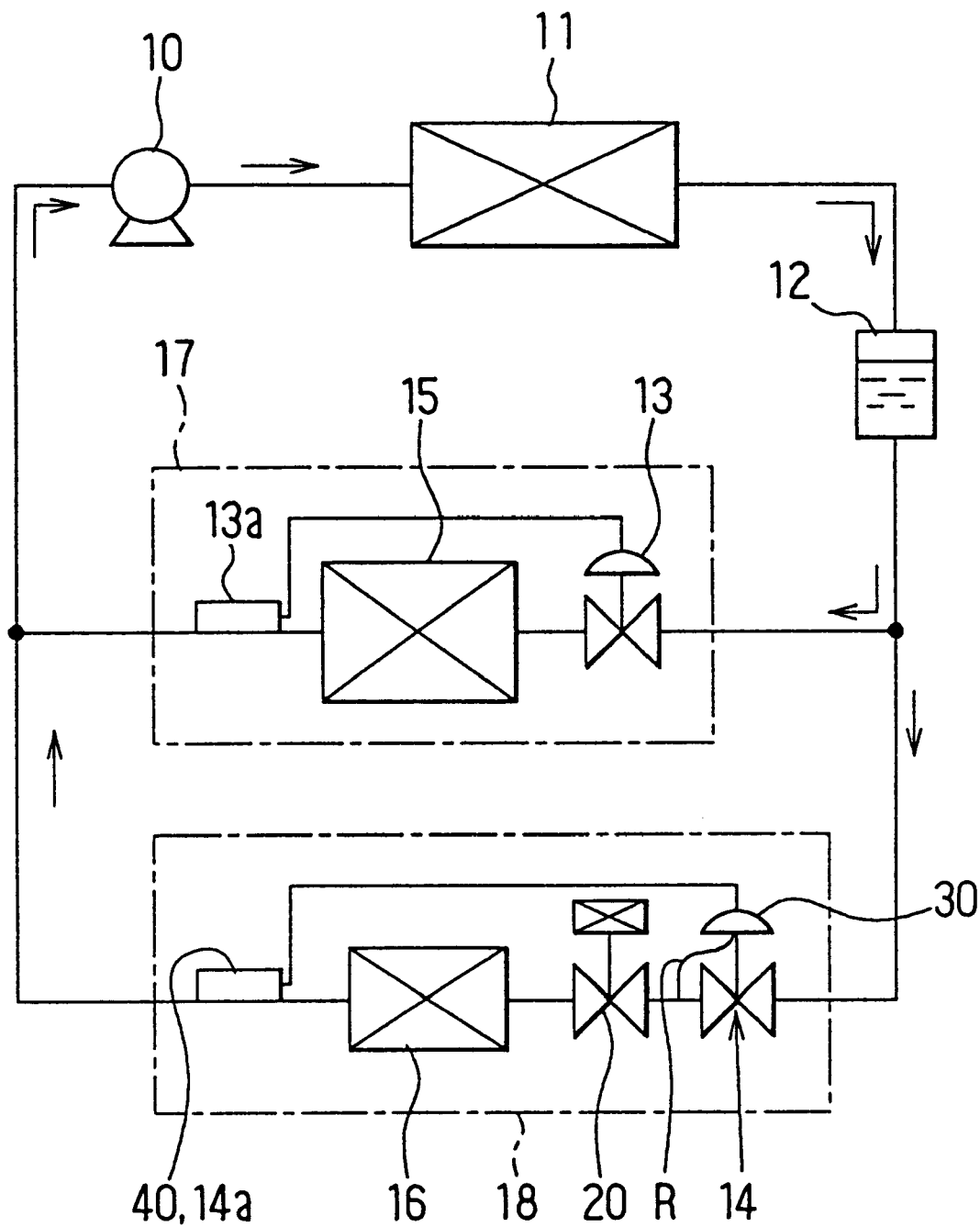
FIG. 8 is a diagram showing a refrigeration cycle including the expansion valve integrated with the electromagnetic valve in the first to third embodiments.

The refrigeration cycle employing the expansion valve 14 integrated with the electromagnetic valve in the first and third embodiments is schematically shown in FIG. 8. Specifically, a pressure introduction path R is provided for applying the refrigerant pressure between the downstream side of the restriction path 144a of the expansion valve 14 and the upstream side of the valve element 200 of the electromagnetic valve 20, into the pressure equalizing chamber 35 below the diaphragm 33 in the diaphragm operating unit 30.

In the first embodiment, the pressure introduction path R is constructed by the communication hole 44, the pressure chamber 43, the groove portion 46, and the communication holes 45, 45a in this order. Further, in the third embodiment, the pressure introduction path R is constructed by the communication hole 44 and the clearance portion 403a.

(Fourth Embodiment)

Figure 9:
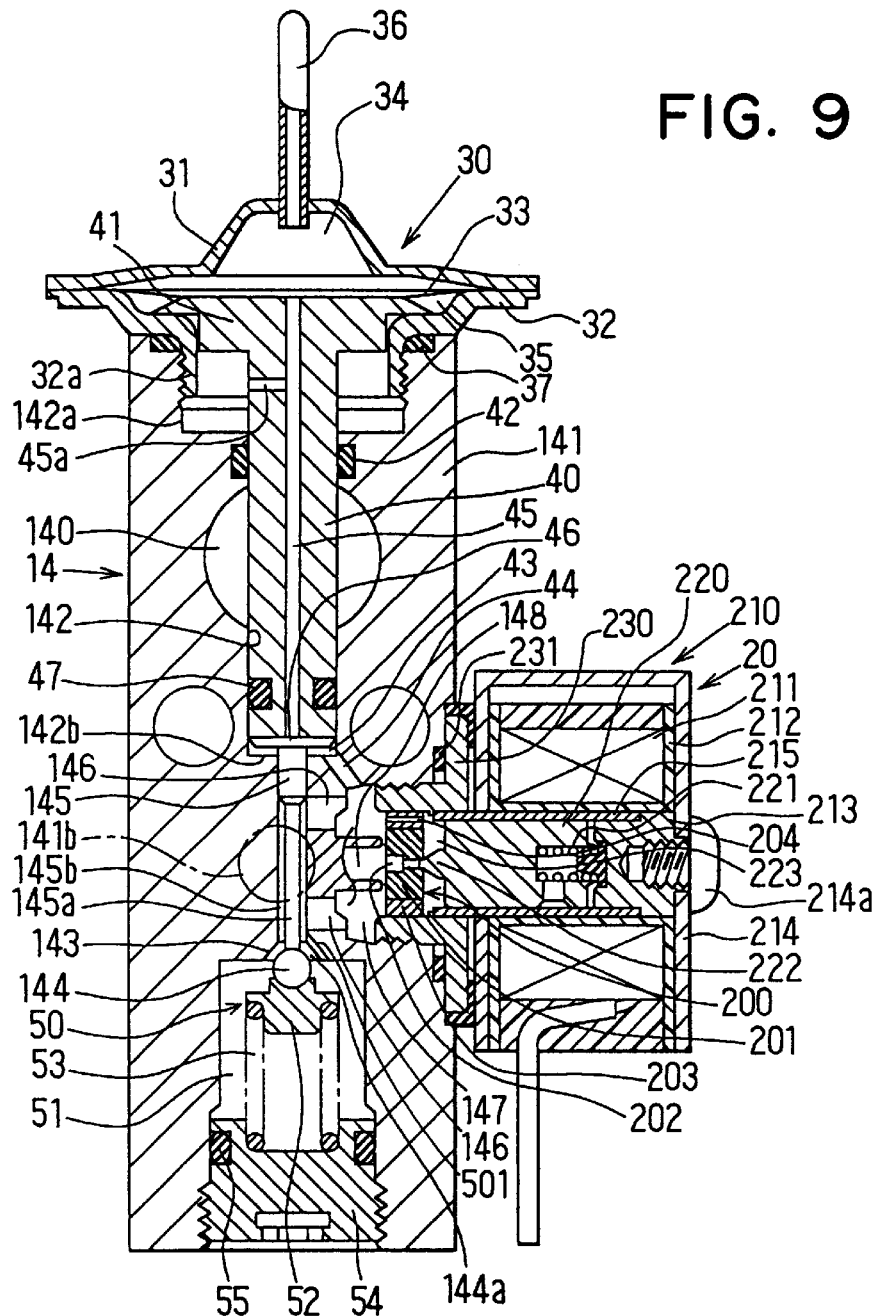
FIG. 9 is a cross-sectional view showing an expansion valve integrated with an electromagnetic valve in a fourth preferred embodiment.
Figure 10:
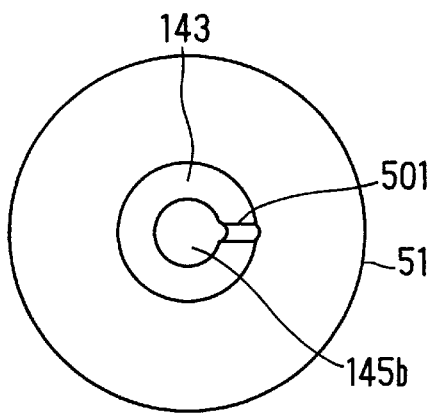
FIG. 10 is a plan view showing a valve seat of the expansion valve shown in FIG. 9.

A fourth preferred embodiment shown in FIGS. 9, 10 is a modified example of the first embodiment shown in FIG. 2. In the first embodiment, the circular minute hole 500 serves as the minute communication passage; however, in the fourth embodiment, a concave notch groove 501 for providing the minute communication passage is formed on part of the valve seat 143, on which the valve element 144 is seated when the expansion valve is closed. The notch groove 501 extends in a radial direction of the valve seat 143 at a position facing the valve element 144. Although FIG. 10 shows only one notch groove 501, several notch grooves may be formed on the valve seat 143.

Accordingly, even if the valve element 144 is seated on the valve seat 143 when the expansion valve is closed, the downstream side and the upstream side of the restriction path 144a directly communicate with one another through the notch groove 501. Therefore, also in the fourth embodiment, when the electromagnetic valve 20 is closed so that the pressure in the communication chamber 147 between the valve element 144 and the valve element 200 becomes to be liable to increase due to the rise in ambient temperature around the expansion valve, the increase in pressure caused by the expansion of the liquid-phase refrigerant is released from the communication chamber 147 into the accommodating chamber 51 through the notch groove 501. As a result, the pressure in the communication chamber 147 can be securely prevented from abnormally increasing.

Incidentally, the notch groove 501 in the fourth embodiment has a resistance substantially the same as that of the minute hole 500 in the first embodiment to provide the minute communication passage. For example, the cross-sectional area of the notch groove 501 is in a range of approximately 0.1 mm$^2$ to 0.2 mm$^2$.

(Fifth Embodiment)

Figure 12:
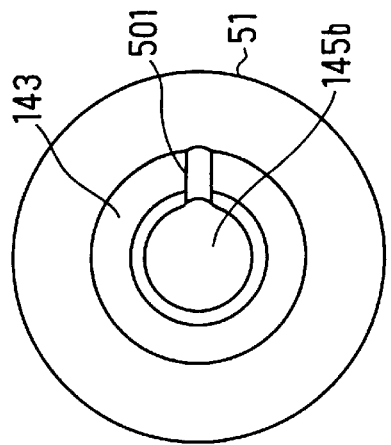
FIG. 12 is a plan view showing a valve seat of the expansion valve shown in FIG. 11.
Figure 11:
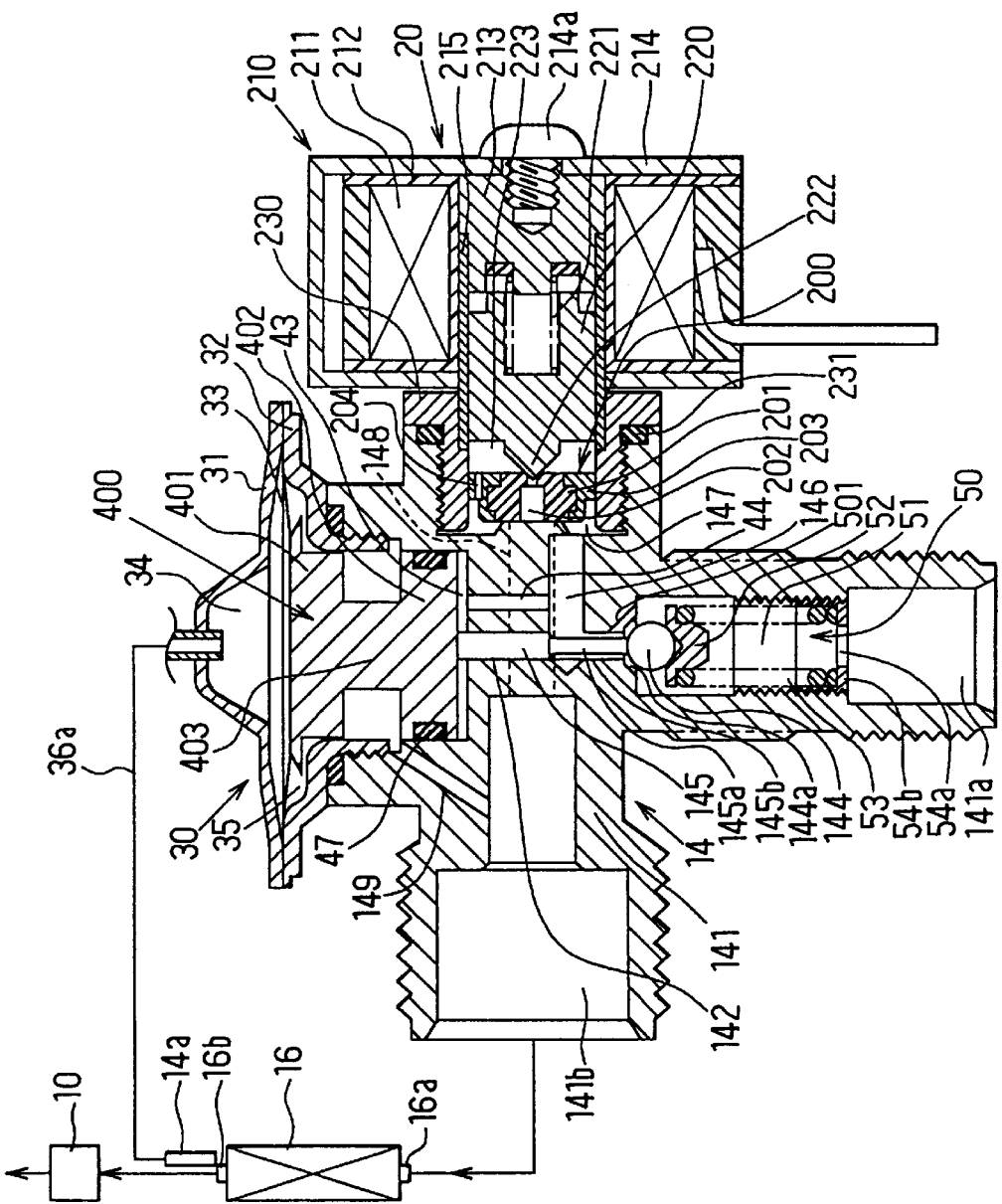
FIG. 11 is a cross-sectional view showing an expansion valve integrated with an electromagnetic valve in a fifth preferred embodiment.

A fifth preferred embodiment shown in FIGS. 11, 12 is a modified example of the second embodiment shown in FIG. 6. In the second embodiment, the circular minute hole 500 serves as the minute communication passage; however, in the fifth embodiment, as in the fourth embodiment, the concave notch groove 501 for providing the minute communication passage is formed on part of the valve seat 143 to extend in the radial direction of the valve seat 143.

Figure 14:
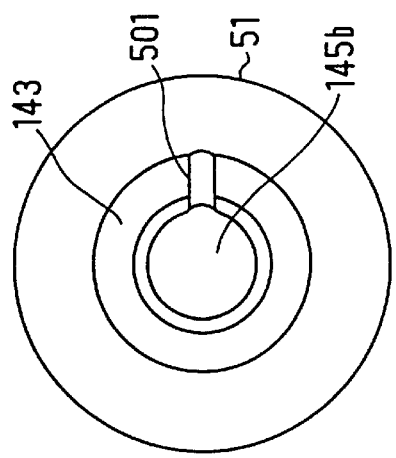
FIG. 14 is a plan view showing a valve seat of the expansion valve shown in FIG. 13.
Figure 13:
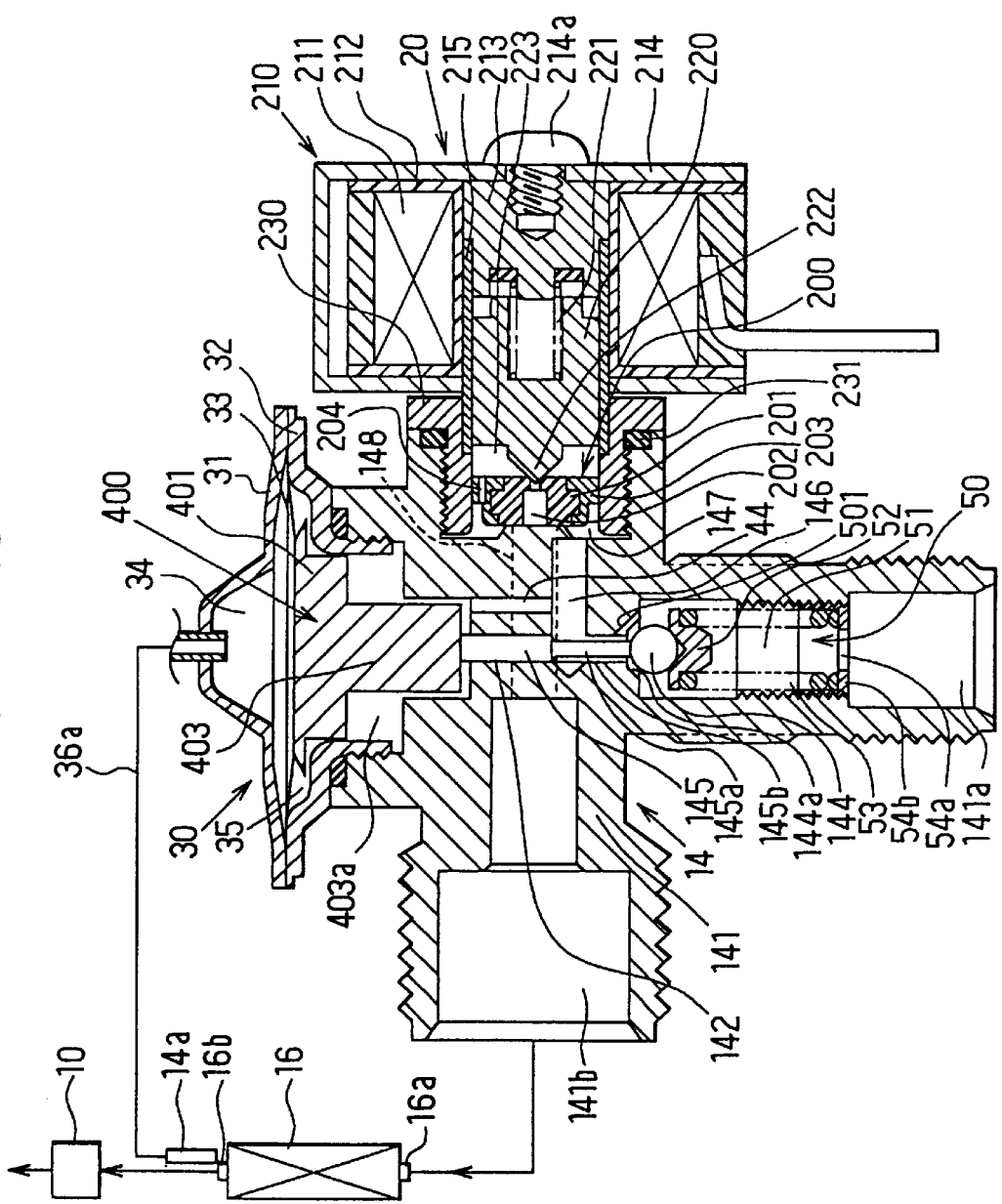
FIG. 13 is a cross-sectional view showing an expansion valve integrated with an electromagnetic valve in a sixth preferred embodiment.

(Sixth Embodiment) A sixth preferred embodiment shown in FIGS. 13, 14 is a modified example of the third embodiment shown in FIG. 7. In the third embodiment, the circular minute hole 500 serves as the minute communication passage; however, in the sixth embodiment, as in the fourth and fifth embodiments, the concave notch groove 501 for providing the minute communication passage is formed on part of the valve seat 143 to extend in the radial direction of the valve seat 143.

The present invention is not limited to the refrigeration cycle for a vehicle, but may be widely employed in refrigeration cycle for an air conditioning apparatus, a freezing apparatus, a refrigerating apparatus, or the like, installed in a general construction building.

Although the present invention has been fully described in connection with the preferred embodiments thereof with reference to the accompanying drawings, it is to be noted that various changes and modifications will become apparent to those skilled in the art. Such changes and modifications are to be understood as being included within the scope of the present invention as defined in the appended claims.

What is claimed is:

1. An expansion valve integrated with an electromagnetic valve employed in a refrigeration cycle, comprising:
   an expansion valve body having therein an inlet refrigerant path for introducing refrigerant, a restriction path for decompressing and expanding the refrigerant introduced from the inlet refrigerant path, and an outlet refrigerant path for discharging therefrom the refrigerant decompressed and expanded in the restriction path;
   a first valve element for adjusting an opening degree of the restriction path; and
   a valve element operating mechanism for moving the first valve element; and
   a second valve element disposed in the electromagnetic valve to open and close the outlet refrigerant path, the electromagnetic valve being integrally assembled to the expansion valve body,
   wherein when the second valve element is closed, the valve element operating mechanism operates based on a refrigerant pressure in a space between the second valve element and the restriction path such that the first valve element is closed; and wherein the space between the second valve element and the restriction path communicates with the inlet refrigerant path through a communication passage.

2. The expansion valve integrated with the electromagnetic valve of claim 1, wherein the communication passage is a hole formed in the expansion valve body.

3. The expansion valve integrated with the electromagnetic valve of claim 1, wherein:

the expansion valve body has a valve seat on which the first valve element is seated;

the restriction path is provided between the valve seat and the first valve element; and the valve seat has a groove as the communication passage for connecting the space and the inlet refrigerant path when the first valve element is seated on the valve seat.

4. The expansion valve integrated with the electromagnetic valve of claim 1, wherein a flow resistance of the refrigerant in the communication passage is larger than that of the restriction path.

5. The expansion valve integrated with the electromagnetic valve of claim 1, wherein the space always communicates with the inlet refrigerant path through a communication passage such that the refrigerant pressure in the space is released through the communication passage.

* * * * *